United States Patent

[11] 3,612,917

| [72] | Inventors | James A. Sutcliffe<br>Redmond;<br>Robert K. Kirschner, Bellevue, both of Wash. |
|---|---|---|
| [21] | Appl. No. | 836,743 |
| [22] | Filed | June 26, 1969 |
| [45] | Patented | Oct. 12, 1971 |
| [73] | Assignee | Sundstrand Data Control, Inc. |

[54] CONTROL CIRCUIT FOR COMPENSATING FOR POWER VARIATIONS UTILIZING CONTROLLED MULTIPLIERS OR DIVIDERS
12 Claims, 1 Drawing Fig.

| [52] | U.S. Cl. | 307/297, 328/1, 307/229, 328/267 |
|---|---|---|
| [51] | Int. Cl. | G05d 3/00 |
| [50] | Field of Search | 328/267, 1; 307/297, 229; 323/18, 73, 22 T |

[56] References Cited
UNITED STATES PATENTS

| 3,174,096 | 3/1965 | Lichowsky | 307/297 |
|---|---|---|---|
| 3,287,623 | 11/1966 | Valancius | 323/22 |
| 3,323,037 | 5/1967 | Doss | 307/297 |
| 3,337,744 | 8/1967 | Johnson | 323/22 |

Primary Examiner—Donald D. Forrer
Assistant Examiner—Harold A. Dixon
Attorney—Hofgren, Wegner, Allen, Stellman & McCord ABSTRACT: An AC power supply powers several transducer circuits, in which input voltage variations cause variations in the output signals from the transducer circuits. A time division multiplier has an input connected to the AC power supply and a second input connected to a fixed DC voltage source. Variation in AC amplitude change the duty cycle of pulses generated by the multiplier. Semiconductor detector gates are driven by the multiplier pulses in order to demodulate and divide the output signals of the transducer circuits by a factor proportional to the duty cycle, thereby compensating for variations from the AC power supply.

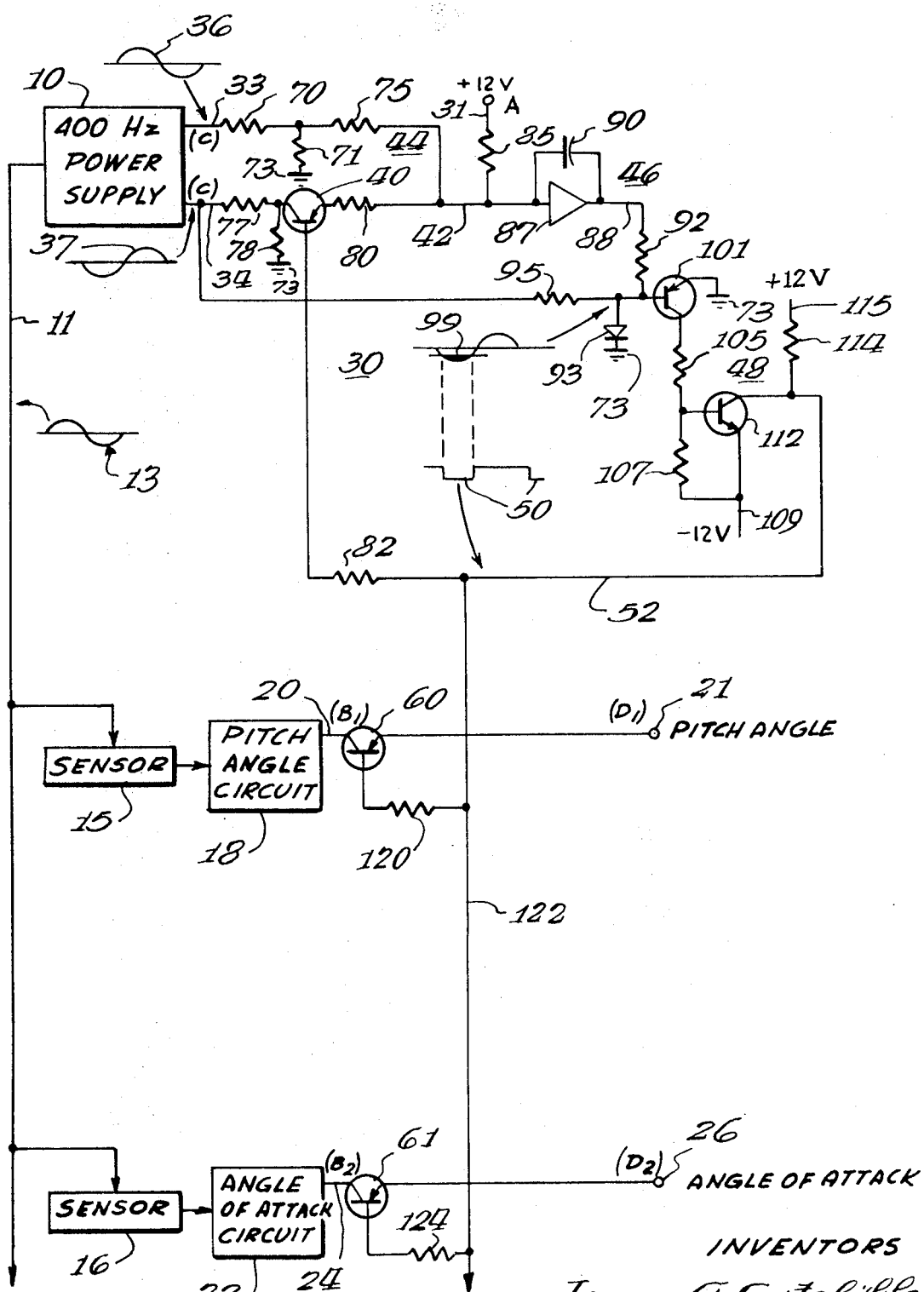

CONTROL CIRCUIT FOR COMPENSATING FOR POWER VARIATIONS UTILIZING CONTROLLED MULTIPLIERS OR DIVIDERS

This invention relates to a circuit for compensating for variations from a power supply, and more particularly to a compensating circuit in which power supply variations cause variations in output signals which are subsequently multiplied or divided by a factor proportional to the variation from the power supply.

In an aircraft control system, a number of transducer circuits measure various flight parameters and generate flight signals proportional to the measured parameters. All of the transducer circuits are usually powered from a single AC power supply, having a frequency such as 400 Hertz. When the amplitude of AC voltage varies, the transducer circuits produce flight signals which undesirably vary in a corresponding manner. Of course, it is desired that the flight signals vary only when the measured parameters vary.

Some attempts have been made to compensate for the above situation. Usually, an attempt is made to regulate the AC power supply more closely. While such technique is partially successful, it is economically unfeasible to prevent all AC power variations, especially when the power supply is in an aircraft or similar self-contained vehicle in which the power supply is driven by engines having output speeds varying across a substantial range of values.

In accordance with the present invention, a novel compensating circuit is provided which compensates for power supply variations by acting upon the output signals from apparatus powered by the power supply. In an aircraft, for example, it is not necessary that many flight signals have values corresponding solely to measured parameters, so long as the ratio between such flight signals at all times is proportional solely to the ratio of the measured parameters. To accomplish this purpose, a time division multiplier is connected to the power supply to produce pulses having a duty cycle proportional to the amplitude of the AC voltage from the supply. The pulses are coupled to demodulators for each of the flight signals, in order to both demodulate and divide the flight signals by a factor proportional to the AC voltage variation. Although the scale factor of the flight signals may be altered, the ratios of the divided flight signals have values independent of variations from the power supply.

The present invention can be used for any system in which a power supply powers one or more signal-generating means whose output signal varies both with a desired quantity and in proportion to the power supply input. Such a compensator is particularly adapted to controlling systems in which a single power supply powers several signal-generating circuits. By dividing each generated signal by a factor proportional to power supply variations, the final output signals are made independent of power supply variations.

One object of this invention is the provision of an improved circuit for compensating for power supply variations, by allowing the variations to cause corresponding variations in generated signals, and operating upon the generated signals in similar manners in order to eliminate variations caused by the power supply variations.

Another object of this invention is the provision of a compensating circuit in which an AC power signal from a power supply is connected to a time division multiplier having a reference DC input, for generating pulses having a duty cycle proportional to variations in the amplitude of the AC signal. The pulses are coupled to gating means which divide output signals generated from circuits powered by the power supply.

Other features and advantages of the invention will be apparent from the description and from the drawing, in which the single FIGURE illustrates the compensating circuit of the present invention.

While an illustrative embodiment of the invention is shown in the drawing and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values and type designations will be given for certain of the components in order to disclose a complete, operative embodiment of the invention. However, it should be understood that such values and type designations are merely representative and are not critical unless specifically so stated. The scope of the invention will be pointed out in the appended claims.

Turning to the single FIGURE, an AC power supply 10 has an AC power signal 13 which is coupled in parallel to power a plurality of sensors 15, 16, only two being illustrated for clarity. Such sensors may take the form of transducers mounted on an aircraft for measuring certain flight parameters, such as pitch angle and angle of attack. Examples of other flight parameters which may representatively be measured by the sensors include the elevator deflection angle and the air speed.

Each sensor is connected to a circuit associated therewith for converting the measured quantity into an output signal. For example, sensor 15 is connected to a circuit 18 which converts the measured quantity into a modulated pitch angle signal, labeled $B_1$, coupled to an output line 20. This output signal is acted upon in accordance with the present invention, as will appear, and is then translated to an output terminal 21 for providing a demodulated pitch angle signal $D_1$. Similarly, sensor 16 is connected to a circuit 23 for converting the measured quantity into a modulated angle of attack signal $B_2$, available on an output line 24. After translation in accordance with the present invention, the demodulated output signal is coupled to an output terminal 26 which provides the angle of attack signal $D_2$ thereon.

The AC power signal 13 from power supply 10 may vary in amplitude. Such variations undesirably cause changes in the signals generated by sensors 15, 16, thereby causing the plurality of output signals $B_n$, where $n$ equals the number of output signals so affected, to have varying amplitude. Other types of variations may occur in the AC power signal 13, which similarly create false output signals $B_n$. For example, the power signal 13 may have an unsymmetrical AC waveform, causing changes in the output signals $B_n$. Another undesirable variation includes noise signals carried on the AC power signal. In accordance with the present invention, the effect of all such variations are eliminated from the final output signals $D_n$.

While the drawing illustrates an exemplary system for an aircraft, it will be apparent that the system is adaptable for any power supply powering one or more circuits, in which variations in the power supply may influence the outputs of the other circuits. While the AC output line 11 has been illustrated as coupled to only sensors 15, 16, it will be apparent that the power supply may also power the circuits 18, 23, or may solely power those circuits. The sensors 15, 16 may generate signals which are accurately proportional to the measured quantity, but power signal variations to the circuits 18, 23 could cause the output signals $B_n$ to vary. The present invention compensates for all such variations resulting from changes in the power supply waveform 13.

The compensator circuit includes a multiplier/divider circuit 30 having an input line 31 on which a reference quantity A is carried, and a second pair of input lines 33, 34 which provide an input quantity C to circuit 30, representing the power signal from power supply 10. Line 33 is coupled to a waveform 36 in phase with waveform 13, and line 34 is coupled to a waveform 37 which is 180° out of phase with waveform 36, and hence waveform 13. Typically, waveforms 13, 36 and 37 have a frequency of 400 Hertz.

Circuit 30 includes a switch device 40 driven between on and off conduction states in order to pass only certain portions of input C to a summing line 42 which is also coupled to input A. Input A on line 31 is connected to a reference source of potential having an amplitude related to the desired characteristic for the AC signal on line 11. In the present example, the AC signal should have a fixed peak amplitude, so input A is of fixed potential, such as +12 volts DC. If the input C was to have other than a fixed value, the input A would be made variable. The circuit 30 is effective, as will appear, to attempt to maintain zero volts on summing line 42. This is accomplished by controlling the duty cycle of device 40, so that the average sum of the two inputs A and C is zero, namely:

$$A+(C)(\text{duty cycle})=0$$

The pair of inputs C are connected in a circuit or network 44 which includes device 40 and causes effectively a full wave rectified signal on summing line 42, which is of such value as to subtract from the fixed magnitude of signal A to produce a difference or error signal whose average value is maintained at zero volts.

Circuit 30 also includes an integrator 46 whose input is the error signal on summing line 42. The output of the integrator is representative of the time difference between the inputs A and the switched and rectified quantity C. The integrated error signal is coupled to a switching circuit 48 which produces pulses 50 on an output line 52. The negative going pulses 50 have a duty cycle which is directly proportional to the division of A by C, or A/C. Line 52 is coupled to switching device 40 to control the ratio of on-to-off time thereof, hence adjusting the average value of the signal C coupled to summing line 42. For example, as the amplitude of the AC waveform increases, the average value of the switched waveform (C)(duty cycle) instantaneously increases. This waveform subtracts from quantity A to produce a negative voltage on summing line 42, which is integrated and causes switching circuit 48 to trigger at a later point in time. This decreases the duty cycle or "on" time of the output pulses 50, in turn decreasing the "on" time of switching device 40, in order to return the line 42 to zero volts average value.

As the amplitude of the AC waveform C increases, each of the output signals $B_n$ has a corresponding increase in amplitude. To compensate for this increase, pulses 50 on line 52 are coupled to separate switching devices 60, 61 associated with each output signal $B_n$, two such devices being illustrated. The pulses 50 control the gating of each of the devices 60, 61, thereby acting upon the signals $B_n$ by a factor proportional to the duty cycle A/C of the pulses 50. This operation can be considered as either a multiplication or a division process. Thus, it can be considered that devices 60, 61 multiply each signal $B_n$ by the duty cycle A/C from circuit 30. Equivalently, because input A is fixed, it can be considered that each of the signals $B_n$ is divided by a quantity C. The combined circuit 30 in conjunction with devices 60, 61 causes the output signals $B_n$ to have a value:

$$D_n=(B_n)(\text{duty cycle})=(B_n)(A/C)$$

As will appear, devices 60 and 61 also function as demodulators, in which the demodulation is proportional to the pulse width of pulses 50.

Considering the compensator system in more detail, the rectifier network 44 provides generally negative going signals to summing line 42, having an average value which is directly proportional to the width of pulses 50. Network 44 includes a voltage divider consisting of a 348-ohm resistor 70 and a 178-ohm resistor 71 connected in series between line 33 and a source of reference potential or ground 73. The junction between resistors 70 and 71 is coupled through a 40.2-kilohm resistor 75 to summing line 42. Line 34, having an oppositely going waveform, is connected to another voltage divider, in the form of a 348-ohm resistor 77 and a 178-ohm resistor 78 connected in series between line 34 and ground 73. The junction of the resistors is coupled to the collector electrode of switching device 40, in the form of a PNP transistor, such as type 2N2946. The emitter electrode of this transistor is coupled through a 20-kilohm resistor 80 to summing line 42. Finally, the base electrode of transistor 40 is coupled through a 39-kilohm resistor 82 to line 52.

The values of resistors 75 and 80 are critical, and are chosen so that resistor 75 has a value twice the value of resistor 80. With these values, the signal passed through transistor 40 and resistor 80 is twice the amplitude of the signal coupled through resistor 75. Since the input waveforms 36 and 37 are oppositely going, the signals coupled through resistors 75 and 80 subtract from each other.

When transistor 40 is saturated, i.e., always on, the positive half-cycle of waveform 36 is always cancelled, so that only a negative going half-cycle is present on summing line 42. As transistor 40 is driven on for a lesser period of time, portions of the positive going waveform are coupled to line 42. However, the gated negative waveform, having twice the amplitude, subtracts so that the average waveform is negative of a value proportional to the on time of transistor 40. The total waveform produced by input C on line 42 has a generally rectified, negative going, average value which is directly proportional to the width of pulse 50, which in turn is directly proportional to the duty cycle A/C.

Input A at line 31 is coupled through a resistor 85, of several hundred ohms, to summing line 42. The net current is coupled to the input of an operational amplifier 87 having an output line 88. A feedback capacitor 90, 0.1 microfarads, is connected between the input and output to cause operational amplifier 87 to function as an integrator. The voltage on output line 88 is proportional to the time integral of the current on summing line 42.

Integrator 46 drives a switching circuit or network 48 which generates pulses 50 on output line 52. Line 88 is coupled through a 10-kilohm resistor 92 and a diode 93 to ground 73. The junction between resistor 92 and diode 93 is connected through a 20-kilohm resistor 95 to line 34 from power supply 10. The summation of the time integral on line 88 with the AC waveform on line 34 produces a waveform 99 at the junction point between resistors 92, 95 and diode 93. This junction point is coupled to the base electrode of a PNP transistor 101, as type 2N3251, whose emitter electrode is connected directly to ground 73. The output collector electrode is connected to a voltage divider consisting of a 75-kilohm resistor 105 and a 10-kilohm resistor 107 connected in series between the collector and a line 109 connected to a source of −12 volts DC. A NPN transistor 112, as 2N718A, has its emitter electrode connected to line 109, and its base electrode connected to the junction between resistors 105 and 107. The collector electrode of transistor 112 is connected through a 51-kilohm resistor 114 to a line 115 connected with +12-volts DC potential. The junction between resistor 114 and the collector electrode is directly connected to line 52.

In operation, switching circuit 48 operates to generate negative going pulses 50 having a duty cycle or pulse width directly proportional to the time integral of the signal on line 88. When a negative switching level is exceeded, by the negative voltage at its base, transistor 101 is forward biased and passes a voltage which forward biases transistor 112, thereby lowering the potential at the collector electrode of transistor 112 and causing a negative going pulse 50 to be generated on line 52.

Line 52 carrying the pulses 50 controls transistor 40, causing the duty cycle of pulses 50 to equal the ratio of A/C. The same pulses 50 are also coupled to the devices 60, 61 in order to compensate for variations from power supply 10. More particularly, device 60, as a PNP transistor-type 2N2946, has its collector electrode directly coupled to output line 20 from circuit 18. The emitter electrode thereof is directly connected to output terminal 21. The base electrode is connected through a 10-kilohm resistor 120 to a line 122 directly connected to line 52. Transistor 61 is connected in a similar manner. Its base is connected through a 10-kilohm resistor 124 to line 122. If the system includes additional circuits for generating signals $B_n$, additional transistor gating circuits are connected as described above.

In operation, transistors 60, 61 function as demodulators for the modulated output signals $B_n$. The controlled time of demodulation adjusts the output signals $D_n$ so as to have a demodulated value corresponding to the ratio A/C. The negative going pulses 50 are coupled via line 122 and the resistors 120, 124 to the corresponding bases of transistors 60, 61, respectively. The negative going pulses drive the transistors into saturation when the collectors thereof are coupled to a positive going waveform, thereby connecting the output terminals 21 and 26 to the output lines 20 and 24, respectively. When the pulse 50 disappears, transistors 60, 61 remain in their nonconductive states, terminating the output signals $D_n$. Thus, the demodulated output signals $D_n$ are equal to the signals $B_n$ times the on time of the rectifier acting transistor gates in series therewith, or $$D_n=(B_n)(\text{duty cycle})=(B_n(A/C)$$

Since the signals $B_n$ are a function directly proportional to $C$, it will be seen that the output signal $D_n$ is thus made independent of the quantity $C$. While the transistors 60, 61 are connected to function as demodulators, it will be apparent that the circuit will work equally well when the transistors are used only as divider gates. Thus, the compensator system may be used to compensate AC and/or DC signals which vary with power supply variations.

We claim:

1. A compensating circuit, comprising:
   power supply means for producing a power signal which undesirably varies from a predetermined value;
   transducer means for measuring a quantity and producing at an output an output signal proportional thereto, said transducer means being coupled to said power supply and undesirably varying said output signal when said power signal varies from said predetermined value;
   reference means for generating a reference signal having a value corresponding to said predetermined value for said power signal;
   control means coupled to said power supply and said reference means for generating a control signal having a value proportional to the deviation between the values of said power signal and said reference signal; and
   proportioning means coupled to the output of said transducer means for multiplying said output signal by a factor proportional to the value of said control signal, whereby the multiplied output signal is proportional to said measured quantity and independent of the varying value of said power signal.

2. The compensating circuit of claim 1 wherein said control means generate pulses corresponding to said control signal and having a duty cycle proportional to the deviation between the values of said power signal and said reference signal, said duty cycle corresponding to said value of said control signal, said proportioning means multiplying said output signal by a factor proportional to the duty cycle of said pulses.

3. The compensating circuit of claim 2 wherein said proportioning means includes gating means coupled between said transducer means and an output terminal for the multiplied output signal, and bias means coupling said control means to said gating means for causing said pulses to drive said gating means between on and off conduction states in accordance with the duty cycle of said pulses.

4. The compensating circuit of claim 3 wherein said transducer means modulates the output signal in proportion to the measured quantity, and said bias means connects said gating means in a demodulator circuit for demodulating said modulated output signal in accordance with the duty cycle of said pulses.

5. The compensating circuit of claim 1 wherein said control means includes a first input coupled to said reference means and a second input coupled to said power supply, a summing point, means coupling said first input to said summing point, gating means having a conducting and nonconducting states under control of the value of said control signal, and means coupling said gating means between said second input and said summing point.

6. The compensating circuit of claim 5 wherein said control means includes in cascade integrator means coupled to said summing point for generating an integrated output and switching means coupled to the integrator means for generating a control signal having a duty cycle proportional to the summation of the first input and gated second input, said switching means being coupled to said gating means to switch the gating means between said states in direct proportion to the duty cycle of the control signal.

7. The compensating circuit of claim 6 wherein said proportioning means includes second gating means having conducting and nonconducting states for translating said output signal to an output terminal for the multiplied output signal, and bias means coupling the output of said switching means to said second gating means for switching the state of said gating means in proportion to the duty cycle of said control signal.

8. A compensating circuit, comprising:
   power supply means for producing an AC power signal;
   transducer means for measuring a quantity and producing an output signal proportional thereto, said transducer means being coupled to said power supply and undesirably varying said output signal when said power signal varies from a predetermined value;
   a DC reference signal having an amplitude corresponding to a desired amplitude for said AC power signal;
   control means including rectifier functioning means coupled to said power supply for producing an average rectified AC power signal, and means coupled to said reference means and said rectifier functioning means for subtracting said average rectified AC power signal from said DC reference signal to generate a control signal having a value proportional to the deviation between the values of said AC power signal and said DC reference signal; and
   proportioning means coupled between said power supply means and an output terminal for the measured quantity for multiplying one of said signals by a factor proportional to the value of said control signal, whereby the output signal at said output terminal is proportional to said measured quantity and independent of the varying value of said power signal.

9. The compensating circuit of claim 8 wherein said rectifier functioning means includes gating means under control of said control signal, first impedance means including said gating means coupled between said power supply and said subtraction means, and second impedance means coupled between said power supply and said subtraction means, said second impedance means having an impedance less than the impedance of said first impedance means, whereby the average of the AC power signals through said first and second impedance means produces said average rectified signal.

10. A circuit for compensating for changes in amplitude of an AC power signal produced by an AC power supply, comprising:
   a plurality of transducer means each measuring a quantity for producing at separate outputs a separate output signal proportional thereto, said transducer means each being coupled through a power input to said power supply and undesirably varying the separate output signals when said AC power signal varies in amplitude;
   reference means for generating a DC signal having a fixed amplitude representative of a desired amplitude for said AC power signal;
   control means coupled to said power supply and said reference means for generating a control signal having a duty cycle proportional to the amplitude difference between said power signal and said reference signal; and
   a plurality of divider means each coupled to a corresponding output of each transducer means for dividing the output signals by a factor proportional to the duty cycle of said control signal, whereby the divided output signals are independent of the varying amplitude of said AC power signal.

11. The compensating circuit of claim 10 wherein said control means includes means for effectively rectifying said AC power signal, means for subtracting the rectified AC power signal from said DC signal to produce a difference signal, means for integrating said difference signal, and switching means responsive to the integrated difference signal exceeding a predetermined level for generating a pulse, said pulse corresponding to said control signal and having a duty cycle proportional to the amplitude difference between said power signal and said reference signal.

12. The compensating circuit of claim 11 wherein said rectifying means includes gating means for translating a signal in proportion to the duty cycle of pulses coupled to the gating means, and means coupling the switching means to said gating means for controlling said gating means by the pulses from said switching means, whereby said control means forms a time division multiplier.